Dec. 19, 1950  D. C. MADDUX  2,534,782
DISPENSING MACHINE FOR ICE CREAM AND SHERBETS
Filed Sept. 16, 1947

INVENTOR
DUANE C. MADDUX
By
Lynn H. Latta
—ATTORNEY—

Patented Dec. 19, 1950

2,534,782

UNITED STATES PATENT OFFICE 2,534,782

DISPENSING MACHINE FOR ICE CREAM AND SHERBETS

Duane C. Maddux, Burbank, Calif.

Application September 16, 1947, Serial No. 774,212

13 Claims. (Cl. 222—80)

This invention relates to a machine for dispensing semi-solid materials such as bulk ice cream, sherbets or other frozen desserts. Its general object is to provide a machine that will dispense the contents of standard cylindrical paper cartons of ice cream or sherbet.

The practice of packing bulk ice cream and sherbet in two and a half gallon and five gallon cylindrical paper cartons has been almost universally adopted by the ice cream manufacturers. The filled cartons are refrigerated and the ice cream or sherbet therein becomes very hard. They usually arrive in this condition at the soda fountain or other retail establishments where they are dispensed. A common method of dispensing the contents of such a carton is to place the carton in a well of a refrigerated dispensing cabinet and to dip the contents from the carton with an ice cream scoop. When the ice cream or sherbet is in the extremely cold, hardened condition, it is extremely difficult to remove it with a scoop. Much time and effort of soda fountain clerks is dissipated in this practice. Usually, by the time the temperature of the ice cream has raised sufficiently so as to bring its consistency to a reasonable softness, making the scooping easy, half of the contents of the container are gone.

A more important objection to the present practice of scooping ice cream from a bulk container is the unsanitary nature of the practice. The ice cream scoop, used over and over again and allowed to lie in the open in between times, becomes contaminated and laden with germs. It is therefore a very unsanitary practice and is so recognized by health authorities.

A primary object of my invention is to provide a machine for dispensing contents of a carton of ice cream or sherbet directly into a dish, ice cream cone or carrying container. More specifically, it is my object to provide a machine for dispensing the contents of a paper ice cream carton through a nozzle into a receptacle.

Another object is to provide such a dispensing machine which may be controlled in a simple manner, such as by simply closing an electric switch.

An important object of the invention is to provide a dispensing machine which will dispense the contents of a carton without creating a large open space in the carton. To this end, the invention provides for continuously maintaining the body of ice cream or sherbet in contact with the outlet, and peeling away the carton as the ice cream is dispensed.

A further object is to provide a dispensing machine adapted to cleanly remove all of the ice cream from a carton without waste. This is accomplished by providing rotary means for shaving away the body of ice cream, in successive layers, beginning at the top of the carton and proceeding to the bottom thereof.

Other objects will become apparent in the ensuing specifications and appended drawings in which.

Figure 1:
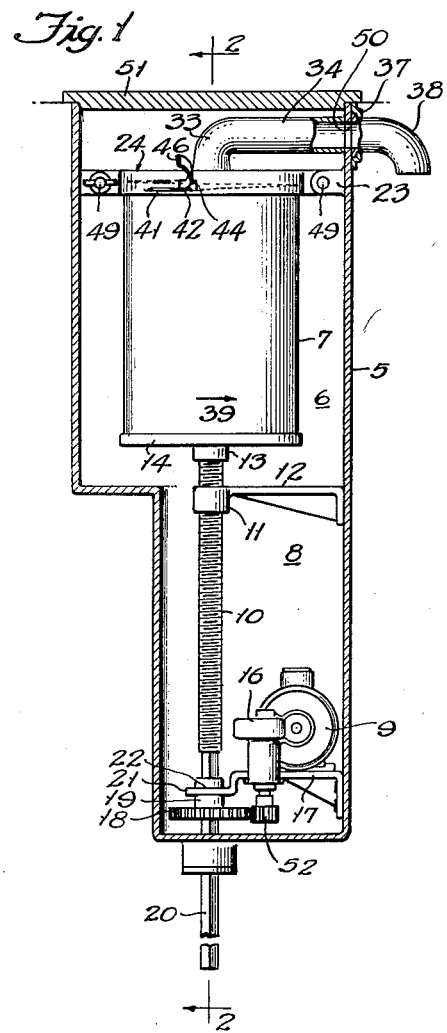
Fig. 1 is a vertical sectional view through the casing of a dispensing machine embodying my invention.
Figure 2:
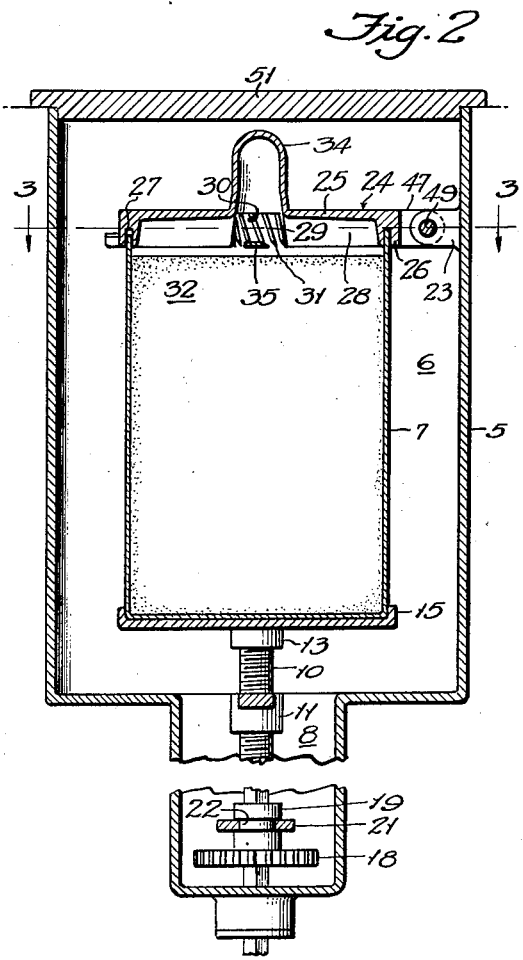
Fig. 2 is a vertical sectional view through the upper part of the machine taken on the line 2—2 of Fig. 1.
Figure 5:
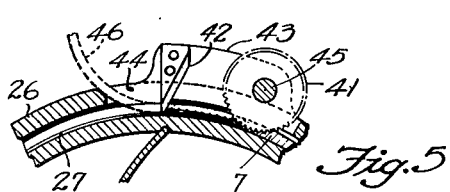
Fig. 5 is a detail sectional view of the same.

As an example of one form in which my invention may be embodied, I have shown in the drawings a dispensing machine comprising a casing 5 having an upper chamber 6 to receive a standard cylindrical ice cream carton 7 and having a lower chamber 8 in which is mounted actuating mechanism including a motor 9 and a feed screw 10 for rotating the carton and simultaneously feeding it upwardly.

The feed screw 10 operates in an internally threaded collar 11 carried by a bracket 12 secured to the casing 5. The upper end of the screw 10 is secured in a boss 13 which carries a circular seat 14 upon which the carton 7 is supported. The flange 15 on the periphery of the seat 14 receives the side wall of the carton 7 with a snug friction fit, and upward pressure of the seat 14 against the carton tends to expand the lower end of the carton sufficiently to maintain a tight wedging fit between the carton and the flange 15, for transmitting drive between the seat 14 and the carton.

The motor 9 drives a reducing gear 16 which is mounted on a bracket 17 secured to the casing 5. The motor 9 is also mounted upon the bracket 17. The reducing gear 16 drives a pinion 52 which meshes with a gear 18. The gear 18 has a hub 19 through which extends a squared shaft 20 constituting a continuation of the feed screw 10. The hub 19 has a squared bore fitting the shaft 20 so as to transmit drive thereto while permitting the shaft to slide vertically therein. The gear 18 is supported by an extension 21 of the bracket 17, which is in the form of a fork engaged in an annular groove 22 in the hub 19.

Projecting inwardly from the wall of the upper chamber 6 near the upper end thereof are a series of lugs 23, spaced circumferentially from each other. The lugs 23 support a cap member 24 which comprises a flat wall 25 having at its periphery a downwardly projecting flange 26. In the flange 26 is a downwardly opening annular channel 27 which receives the rim of the carton 7 with sufficient looseness to permit the carton to rotate therein.

Projecting inwardly from the inner wall of the flange 26 are a plurality of scraping blades 28. The upper and outer extremities of the blades 28 are joined with the top wall 25 and flange 26 respectively, either by being cast integrally therewith or by being inset therein. In the latter case the blades may be of a harder metal than the cap 25, 26. The inner ends 29 of the blades 28 are spaced from the axis of the carton to define an outlet 30 through which may be extruded the ice cream or sherbet that is scraped by the lower edges 31 of the blade from the body of ice cream or sherbet 32 within the carton 7.

Figure 3:
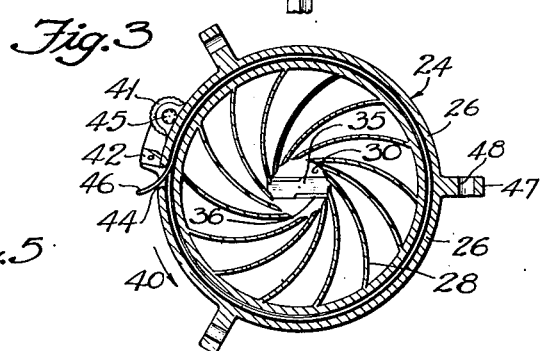
Fig. 3 is a horizontal sectional view of the machine taken on the line 3—3 of Fig. 2.
Figure 4:
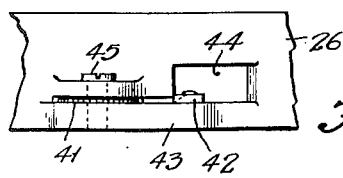
Fig. 4 is a detail view of a portion of the machine.

Communicating with the outlet 30 is the elbow portion 33 of a delivery tube 34 which may be formed as an integral part of the cover 24. Traversing the outlet 30 is a blade 35 for slicing the columns of ice cream that is fed upwardly through the outlet 30. The blade 35 has a pair of cutting edges extending from the center of the blade in opposite directions and lying on opposite sides of the blade. These cutting edges are indicated at 36 in Fig. 3.

The delivery tube 34 communicates with a fitting 37 to which a delivery nozzle 38 may be applied. It is contemplated that a plurality of nozzles of different sizes may be selectively applied to the fitting 37.

The blades 28 are spiral shaped, each subtending an acute angle with reference to a radius of the axis of rotation of the carton. Viewed from above, the carton rotates counterclockwise as indicated by the arrows 39 and 40 in Figs. 1 and 3 respectively. Consequently, the movement of the body of ice cream or sherbet 32 against the lower edges of the blades causes each blade to effect a slicing action against the upper surface of the body, and at the same time the particles that are shaved from the top of the body are fed inwardly by the inclination of the blades 28 until they reach the outlet 30, where they will collect and be forced upwardly through the delivery tube elbow 33.

While the top of the body of ice cream or sherbet is being shaved away, the rim of the carton 7 will be cut away by a pair of knives 41 and 42. The knives 41 and 42 are mounted on a shelf 43 on the flange 26 and project through a slot 44. The knife 41 is a rotary perforating type knife, journalled on a pivot 45, and the knife 42 is a straight edged knife. The perforating knife 41, rotating against the cylindrical wall of the carton 7, cuts through a majority of the thickness of the wall, and the knife 42 completes the severing of the wall, whereby a ribbon 46 of the carton wall is progressively peeled from its upper rim. The ribbon 46 will be fed outwardly through the aperture 44.

The operation of the machine will be apparent from the foregoing description. Operation is effected by energizing the motor 9 and as long as the motor runs the carton 7 will be rotated, the upper surface of the body of ice cream or sherbet 32 will be scraped away and forced upwardly through the outlet 30 and delivery tube 33 to the nozzle 38, and the ribbon 46 of the carton wall will be peeled away and fed outwardly through the opening 44.

The cover 24 is removably connected to the lugs 23 by means of lugs 47 having aperture 48 therein to receive removable securing elements 49, such as bolts, for securing the lugs 47 to the lug 23. The delivery tube 33 fits against the inner surface of the wall of the chamber 6, in communication with an opening 50 in the wall, but is not attached to the wall. Consequently, the cover 24 and delivery tube 33 may be simply lifted out of the casing 5 when the securing elements 49 have been removed, and thus a new carton may be inserted into the machine in place of a carton that has been used up.

It will be understood of course that the casing 5 may form a part of a refrigerated dispensing cabinet and may be provided with a suitable lid 51 for normally closing the upper end of the chamber 6.

The rim of the carton is supported in the channel 27 during the operations of shaving the material from the upper surface of the body of ice cream or the like 32 and stripping away the carton wall. The outer wall of the flange 26 supports the carton wall against expansion under the pressure applied to the body of ice cream or the like by the blades 31. The inner wall of the flange 26 supports the carton wall against the inward pressure of the knives 41 and 42 in the stripping operation. The inner wall of the flange 26 in effect forms a mandrel which forces the carton wall against the disc knife 41 to effect the cutting operation of that knife.

I claim:

1. Apparatus for dispensing frozen confection material from an open ended cylindrical carton of readily destructible material, comprising means for feeding the carton progressively toward its open end, means associated with said open end including cutting means for engaging the contents of the carton and stripping means for progressively removing a ribbon of material circumferentially from the rim of the carton, and means for producing relative rotation between said associated means and the carton whereby to render said cutting and stripping means operative as the carton is fed thereto.

2. Apparatus for dispensing frozen confection material from an open ended cylindrical paper carton, comprising means operable at the open end of the carton, said means including cutting means for engaging the body of frozen material and stripping means for engaging the rim of the carton, means supporting said cutting and stripping means in fixed positions and means for simultaneously rotating said carton and bodily feeding it axially into said cutting and stripping means, whereby to render said cutting means effective to remove successive layers from the open end of the body of the frozen material and said stripping means effective to remove, in a helical path, a narrow ribbon of the wall of said carton at the rim thereof.

3. Apparatus for dispensing frozen confection material from an open ended cylindrical paper carton, comprising a closure for the open end of the carton, said closure having an outlet, a spout communicating with said outlet for delivering the frozen material, means supporting said closure and spout in fixed positions, a turntable for supporting and engaging the bottom of the carton, means for simultaneously rotating said turntable and moving it axially toward said closure to rotate the carton and feed it into the closure, cutter means carried by the closure and rendered operative by said rotating and feeding movement to progressively remove successive layers of the body of frozen material from the open end of the container and stripping means carried by the closure and rendered operative by said rotating and feeding movement to progressively remove, in a helical path, a narrow ribbon of the wall of the container from the rim thereof.

4. Apparatus for dispensing semi-solid material from an open ended cylindrical paper carton, comprising a closure having a rim provided with a channel to receive the rim of the carton at said open end, means supporting said closure in a fixed position, means to engage the bottom of the carton and to rotate the carton and progressively feed it axially into said channel, said closure having an outlet, means communicating with said outlet for delivering the ice cream, cutter means carried by the inner side of said closure and rendered operative by said rotating and feeding movement to progressively remove successive layers from the open end of the body of material in the carton, said means also being operative to feed the removed material to said outlet, and stripping means carried by the rim of the closure and engaging the rim of the carton and rendered operative by said rotating and feeding movement to progressively strip, in a helical path, a narrow ribbon of the wall of the carton from the rim thereof.

5. Apparatus as defined in claim 4, wherein said stripping means comprises a rotatable perforating knife for initially perforating the carton wall and a straight edged knife positioned to engage the carton wall in the cut made by the perforating knife and to complete the severance of the wall.

6. Apparatus for dispensing a semi-solid material from an open ended cylindrical paper carton, comprising a closure for the open end of the carton, said closure having a central outlet, means to engage the bottom of the carton and to simultaneously rotate and feed the carton axially into said closure, a plurality of knives carried by the inner side of said closure and having cutting edges arranged in a common plane substantially normal to the axis of rotation of the carton and spiralled inwardly in the direction of rotation of the carton, with their inner ends spaced from the axis of rotation to define an outlet, said cutting edges being rendered operative by said rotation and feeding movement of the carton to progressively remove successive layers of the body of material in the carton, the spiralling inclination of said knives being such as to feed the material thus removed inwardly to said outlet, and means communicating with said outlet to deliver the material thus removed.

7. Apparatus for dispensing semi-solid material from an open ended cylindrical container, including a housing, a turntable for supporting the bottom of the container and transmitting rotation thereto, means mounted in said housing for simultaneously rotating said turntable and shifting it toward the open end of the carton, a closure mounted in a fixed position in said housing for engaging said open end of the container, said closure having an outlet, shaving means carried by the inner side of the closure for engaging the body of ice cream or the like, progressively removing successive layers of material therefrom and delivering the same through said outlet, and means providing a detachable connection between said closure and a wall of said housing for securing the closure in its operative position and permitting the removal of the closure for the insertion of a fresh container in the housing.

8. Apparatus for dispensing a semi-solid material from a cylindrical paper carton, comprising a housing, a turntable for supporting the bottom of the carton, means on said turntable for engaging the carton to transmit rotation thereto, a threaded shaft disposed vertically in the housing and secured at its upper end to the bottom of said turntable, a non-circular shaft forming a downward extension of the lower end of said threaded shaft, a gear having a hub through which said non-circular shaft extends, said hub being fitted to said non-circular shaft so as to transmit drive thereto while permitting the same to shift axially therein, a pinion driving said gear, a motor, a reduction gear driving said pinion from said motor, means having threaded engagement with said shaft to cause the same to feed the turntable upwardly as said shaft is revolved, a closure having at its rim a downwardly extending flange that is formed with a channel receiving and supporting the open rim of said carton, means providing a detachable connection between said closure and said housing for supporting the closure in axial alignment with said shaft and receiving the carton rim, a plurality of spirally disposed blades extending downwardly from the under side of said closure and having lower cutting edges for engaging the upper surface of the body of material in the carton and, as the result of said rotating and feeding movement, to progressively remove successive layers from said upper surface, and feed the material thus removed to the center of the closure, cutting means carried by said closure flange in the outer wall of said channel and engaging the rim of the carton for progressively stripping therefrom, in a helical path, a narrow ribbon of the wall of the carton, said closure having a central outlet, and means communicating with said outlet and with an opening in the wall of said housing for dispensing the material thus removed.

9. Apparatus as defined in claim 4, wherein said stripping means comprises a rotatable cutter disc rotatably mounted on said closure, said rim having an aperture through which a part of said disc projects into said channel, said channel including an inner wall supporting said carton against the thrust of said disc.

10. Apparatus for dispensing a semi-solid material from an open ended cylindrical paper carton, comprising a closure for the open end of the carton, said closure having an axially opening outlet, means supporting said closure in a fixed position, means to engage the bottom of the carton and to simultaneously rotate and feed the carton axially into said closure, a knife carried by the inner side of said closure in a fixed position and having a cutting edge arranged substantially normal to the axis of rotation of the carton, said knife communicating with said outlet and being rendered operative by said rotating and feeding movement of the carton to progressively remove successive layers from the open end of the body of material in the carton and to direct the same into said outlet.

11. Apparatus for dispensing a semi-solid material from a cylindrical paper carton, comprising supporting means, a turntable for supporting said carton, means on said turntable for engaging the bottom of the carton to transmit rotation thereto, a threaded shaft disposed vertically in the housing, secured to and supporting said turntable at its upper end, a non-circular shaft for driving said threaded shaft, a motor, reduction gearing for driving said non-circular shaft from said motor, said non-circular shaft transmitting rotation to said threaded shaft while permitting the latter to move axially with reference to said reduction gearing, means having threaded engagement with said shaft to cause the same to feed the turntable upwardly as said shaft is revolved, a closure having at its rim a downwardly extending flange formed with a channel receiving and supporting the open rim of said carton, means providing a detachable connection between said closure and said supporting means for supporting the closure in axial alignment with said shaft, in a fixed position, said closure having a fixed outlet, a shaving blade carried in a fixed position by said closure on the underside thereof, and having a lower cutting edge for engaging the upper surface of the body of material in the carton, said knife communicating with said outlet and functioning as the result of said rotating and feeding movement to progressively remove successive layers of material from the upper surface of said body and to feed said material into said outlet, and a rotatable cutting disc carried by said closure flange and engaging the rim of the carton for progressively stripping therefrom, in a helical path, a narrow ribbon of the wall of the carton.

12. Apparatus for dispensing a semi-solid material from a cylindrical paper carton, comprising supporting means, a turntable for supporting the carton, means on said turntable to engage the bottom of the carton and transmit rotation thereto, a threaded shaft on the upper end of which said turntable is secured and supported, a motor, reduction gearing driven by said motor, an axially extensible drive connection between said reduction gearing and said threaded shaft for rotating the latter, means carried by said supporting means and having threaded engagement with said shaft to cause the same to feed the turntable upwardly as said shaft is revolved, a closure having an outlet and having at its rim a downwardly extending flange receiving and supporting the open rim of said carton, means providing a detachable connection between said closure and said supporting means for supporting the closure in a fixed position in axial alignment with said shaft, receiving the carton rim, a blade carried in a fixed position by the underside of said closure, extending downwardly and having a lower cutting edge for engaging the upper surface of the body of material in the carton, and, as the result of said rotating and feeding movement, to progressively remove successive layers from said upper surface and to feed the same to said outlet, and a disc cutter rotatably carried by said closure flange and engaging the rim of the carton for progressively stripping therefrom in a helical path, a narrow ribbon of the wall of the carton.

13. Apparatus for dispensing a semi-solid material from a cylindrical paper carton, comprising supporting means, a turntable for supporting the carton, means on said turntable to engage and transfer rotation to the bottom of the carton, a threaded shaft disposed vertically in the housing, said turntable being secured to and supported on the upper end of said shaft, a motor, reduction gearing driven by said motor, an axially extensible drive connection between said reduction gearing and said threaded shaft, means having threaded engagement with said shaft to cause the same to feed the turntable upwardly as said shaft is revolved, a closure for said carton, means providing a detachable connection between said closure and said supporting means for supporting the closure in axial alignment with said shaft and in engagement with the carton rim, said closure having an axially opening outlet, a blade communicating with said outlet, carried in a fixed position by the underside of said closure, projecting downwardly, having a lower cutting edge for engaging the upper surface of a body of material in the carton, and functioning, as the result of said rotating and feeding movement, to progressively remove successive layers of said material from the upper surface thereof and to feed the same into said outlet, and a cutting disc rotatably mounted on said closure and engaging the rim of the carton for progressively stripping therefrom, in a helical path, a narrow ribbon of the wall of the carton.

DUANE C. MADDUX.

REFERENCES CITED

The following references are of record in the file of this patent:

UNITED STATES PATENTS

| Number | Name | Date |
|---|---|---|
| 971,408 | Ritter | Sept. 27, 1910 |
| 1,255,813 | Brew | Feb. 5, 1918 |
| 1,568,660 | Dumas | Jan. 5, 1926 |
| 1,610,484 | Boggero et al. | Dec. 14, 1926 |
| 1,761,875 | Cordell et al. | June 3, 1930 |
| 1,762,943 | Zauder | June 10, 1930 |
| 1,940,138 | McAdams | Dec. 19, 1933 |
| 1,965,271 | Wharton | July 3, 1934 |
| 2,318,928 | Deighton | May 11, 1943 |

FOREIGN PATENTS

| Number | Country | Date |
|---|---|---|
| 675,465 | France | Oct. 21, 1929 |